Figure 1:
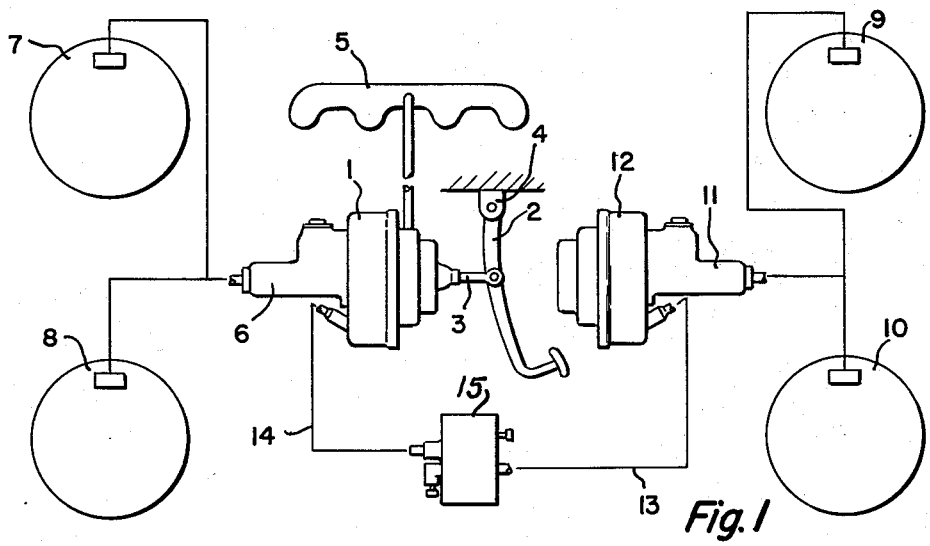

Nov. 14, 1961   E. S. MOYER   3,008,771
VACUUM CONTROL VALVE
Filed Nov. 27, 1959

INVENTOR.
Elton S. Moyer
BY
His Attorney

United States Patent Office 3,008,771
Patented Nov. 14, 1961

3,008,771
VACUUM CONTROL VALVE
Elton S. Moyer, Dayton, Ohio, assignor to General Motors Corporation, Detroit, Mich., a corporation of Delaware
Filed Nov. 27, 1959, Ser. No. 855,824
3 Claims. (Cl. 303—24)

This invention relates to a vehicle braking system and more particularly to an inertia valve for controlling the vacuum to a booster unit.

In the conventional vehicle braking system, the four wheels of the motor vehicle are braked at a constant proportion relative to each other. In braking the vehicle wheels at a constant proportion, this does not account for the dynamic shifting of the weight of the vehicle as the vehicle is decelerated. This can be controlled by employing a separate braking system for the front wheels from that of the rear wheels. In other words, a booster unit for the front wheel braking system and a second booster unit for the rear wheel braking system may be employed. The front wheel booster is manually operated and the rear booster unit may be controlled by an inertia valve.

Accordingly, this invention is intended to provide such a valve to control the braking by shifting additional braking effort to the front wheels beyond a predetermined rate of deceleration.

It is an object of this invention to provide an inertia controlled vacuum valve to control the operation of a booster unit for actuating the vehicle brakes.

It is a further object of this invention to provide an inertia valve which utilizes the moving air through the valve to assist the movement of the inertia member and uses air to cushion the seating of the valve by means of a dashpot.

It is a further object of this invention to provide an inertia element which operates in an arcuate motion and is partially controlled by air pressure in the initial movement of the inertia member and also in seating of the vacuum valve during its operation.

The objects of this invention are accomplished by employing dual booster units wherein the front booster unit is for operating a hydraulic system in communication with front wheel brakes. A rear booster unit operates the rear wheel brakes through a rear hydraulic brake fluid system. The vacuum chambers of the two booster units are in communication with each other through the inertia valve. The inertia valve element is mounted on a member which is guided to insure accurate seating on the valve seat and is connected to the intermediate portion of a pivoting lever. The pivoting lever is provided with a weight on its one end and has its intermediate portion pivotally actuated by a plunger. The plunger has a portion wherein the air rushing through the valve impinges upon the end of the plunger to assist in forward movement of the inertia member. The opposite end of the plunger is provided with a sealed means operating within the dashpot to cushion the effect of the vacuum valve as the pivoting member seats the vacuum valve on its valve seat. In this manner, the inertia valve provides a cutoff valve for the rear booster unit depending upon a predetermined rate of deceleration of the motor vehicle.

Further objects and advantages of the present invention will be apparent from the following description, reference being had to the accompanying drawings wherein a preferred embodiment of the present invention is clearly shown.

Figure 2:
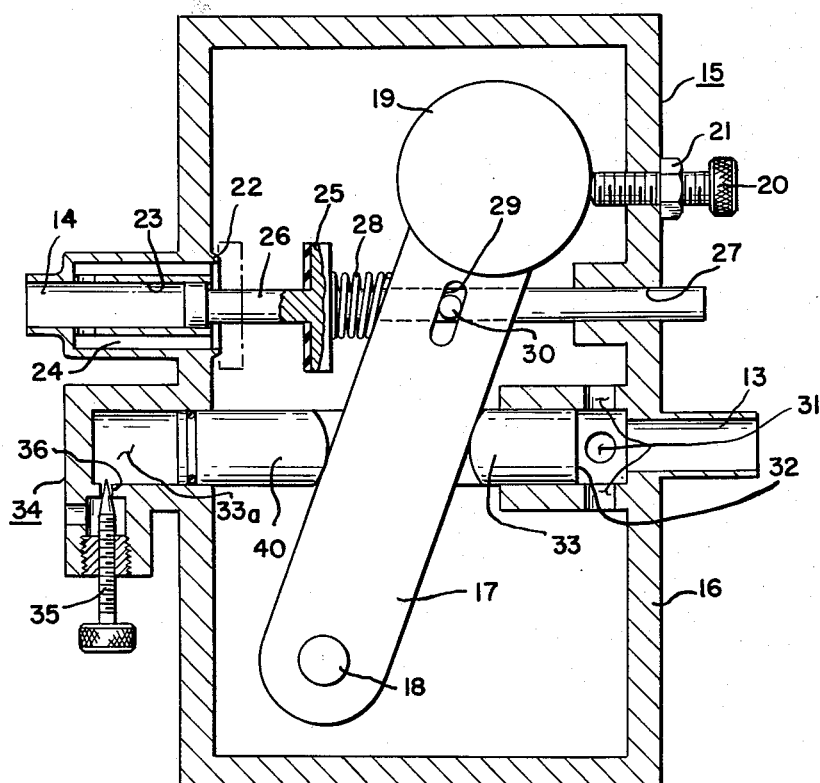

In the drawings:
FIGURE 1 is a schematic view of the braking system employing dual booster units.
FIGURE 2 is a cross-section view of the inertia valve which is employed to control the vacuum to the rear booster unit.

The drawings illustrate the particular location and the details of the inertia valve. The particular structure and operation of each individual booster unit is not shown in these drawings. The booster units and the fluid systems actuated by the booster units are more specifically set forth in a copending application of the same assignee, Serial No. 855,777 filed November 27, 1959. The copending application illustrates a different vacuum control valve for the rear booster unit from that illustrated in this application. The particular feature of interest in this invention is the inertia valve as shown in FIGURE 2.

The front booster unit 1 is manually operated by a brake pedal shoe pivotally connected to a push rod 3. The brake pedal 2 is pivotally mounted on the chassis 4. The brake pedal 2 controls the air in vacuum valves within the booster unit 1. A source of vacuum is shown in the manifold 5 which is in communication with the vacuum chamber of the front booster 1. The booster unit pressurizes fluid within the master cylinder 6 which is in communication with the hydraulic wheel cylinders for the front wheels 7 and 8. In this manner, the front wheel brakes are actuated in response to the movement of the brake pedal 2.

The rear wheel brakes 9 and 10 are actuated through the hydraulic system in communication with the rear hydraulic master cylinder 11. Fluid is pressurized in the rear hydraulic master cylinder 11 by means of the rear booster unit 12. The vacuum chamber in the rear booster unit 12 is in communication with the vacuum chamber of the front booster unit 1 through the conduit means 13 and 14. The conduit means 13 and 14 are connected through the inertia valve 15.

The inertia valve 15 includes a housing 16 for enclosing the inertia valve and the inertia member for operating the valve. The inertia member is shown in the form of a lever 17 pivotally mounted on the pin 18. The upper end of the inertia member or lever 17 forms a weight 19. The weight 19 rests in its retracted position against the adjusting screw 20 which threadedly engages the housing 16. The adjusting screw provides a means for determining the degree of deceleration of the motor vehicle required to initiate forward movement of the lever 17. The adjusting screw 20 is provided with a lock nut 21 to retain the adjusting screw in its adjusted position.

The vacuum valve is formed with a valve seat 22 on the housing 16. A passage means 24 is provided from the conduit 14 to the inner portion of the housing 16 concentric with the valve seat 22. The central portion of the opening 23 forms a guide for the end of the valve element 25. The valve element 25 is mounted on the guide rod 26 which extends forwardly through the guiding portion in the central part of the passage 23. The rearward end of the guide rod 26 is also guided within a portion of the housing forming the opening 27. In this manner, positive alignment of the valve seat 22 is assured with valve element 25.

The valve element 25 is mounted on the guide rod 26 which receives a spring 28 between the valve element 25 and the lever 17. A longitudinal slot 29 is formed in the lever 17 which receives the pin 30 which is carried on the guide rod 26. In this manner, a movement of the lever 17 carries the guide rod and accordingly moves the valve seat 25 in an axial motion as the lever 17 pivots about its mounting pin 18.

The lever 17 is normally in its retracted position resting on the forward end of the screw 20. In this position the vacuum is drawn through the conduit 13 and the passages 31 leading into the housing 16. The vacuum is then drawn through the passage 24 and through the conduit 14. As the vacuum is drawn through conduit 13, the air impinges on the planar surface 32 on the end of the plunger 33. In this manner, the air assists in the forward movement of the lever 17 during the initial portion of the stroke of the inertia element. As the lever 17 pivots about its pin 18, the plunger 33 moves forwardly compressing air within the chamber 33a of the dashpot 34. The compression of the air within the chamber 33a cushions the effect of the forward movement of the inertia element 17. The degree of compression within the chamber 33a is controlled by the needle valve 35 within the orifice 36. The greater the opening in the orifice 36 the less the compression in 33a.

The operation of this invention is in the following described manner. As the brake pedal 2 is depressed, the control valves within the front booster unit 1 are actuated thereby operating the front booster unit. The vacuum from the manifold 5 causes the power wall to move forwardly pressurizing fluid within the master cylinder 6 and actuating the front wheel brakes 7 and 8 through the front hydraulic fluid brake actuating system. The conduits 13 and 14 are in communication with each other through the open valve in the inertia valve 15. In this manner, the vacuum chamber of the rear booster unit 12 operates simultaneously with the front booster unit 1. The rear booster unit 12 pressurizes fluid within the rear master cylinder 11 thereby actuating the rear wheel brakes 9 and 10 through the rear hydraulic fluid brake actuating system. The vehicle brakes on all four wheels in the initial period of brake actuation all actuate with a constant increasing ratio.

A vacuum is drawn from the vacuum chamber of the rear booster unit 12 through the vacuum chamber of the front booster unit 1 from the manifold 5. The movement of air in evacuating the rear vacuum chamber in the rear booster unit 12 impinges upon the planar surface 32 of the plunger 33. This movement of air assists the initial movement of the lever 17 and the weight 19. When a predetermined rate of deceleration is reached in the motor vehicle, the lever 17 pivots forwardly carrying the guide rod 26 and the valve element 25.

The lever 17 pivots the weight 19 in an arcuate motion. For this reason, once the lever movement is initiated, a lesser force is required to continue the forward motion of the weight 19. Without the dashpot 34, the lever 17 would cause the valve element 25 to seat on the valve seat 22 with a sudden movement. This, however, is eliminated by providing the dashpot 34. As the lever 17 pivots forwardly, the plunger 33 is also carried forwardly and the piston 40 pressurizes fluid within the chamber 33a of the dashpot. The degree of pressurization in the chamber 33a is dependent upon the opening of the orifice by the needle valve 35.

With the cushioning effect of the compressed air within chamber 33a the valve element 25 is softly seated on the valve seat 22. Once the element 25 seats on the valve seat 22, the increased vacuum in the conduit 14 caused by further actuation of the front wheel brakes due to depression of the pedal 2 causes a firm seating of the valve. The valve will remain closed until the pressure in conduit 14 is higher than the pressure in conduit 13. This will be present when the brakes on the front wheels are released and the vacuum chamber is again returned to a higher pressure due to opening of the air valve in the front booster unit 1.

At this point, the lever 17 is permitted to pivot rearwardly and open the vacuum valve for controlling the rear booster unit. The lever 17 pivots rearwardly due to the gravitational force acting on the lever. The lever 17 at no point reaches a vertical position so pivots rearwardly when the front brakes are released. The position of the ball or the weight 19 is determined by the position of the adjusting screw 20.

While the embodiment of the present invention as herein disclosed constitutes a preferred form, it is to be understood that other forms might be adopted.

What is claimed is as follows:

1. In a vehicle braking system having a vacuum-operated, manually controlled front booster unit adapted for pressurizing fluid in a front hydraulic fluid brake actuating system and a vacuum-operated inertia controlled rear booster unit adapted for pressurizing fluid in a rear hydraulic fluid brake actuating system, an inertia valve means including a valve housing, an inertia lever pivoted on its lower end within said valve housing, a vacuum conduit in communication with source of vacuum through said front booster unit to said rear booster unit, a valve seat in said vacuum conduit in said valve housing, a valve element engaging said valve seat, a valve guide supporting said valve element connected to the intermediate portion of said inertia lever, a dashpot, a needle valve adjustment to control the degree of pressurization within the air chamber of said dashpot, a piston member operating within said dashpot pivotally connected to the intermediate portion of said inertia lever, said inertia lever provided with an adjusting screw to control the position of the inertia lever in its retracted position thereby controlling the degree of deceleration of said motor vehicle to initiate actuation of said vacuum control valve.

2. In a vehicle braking system having a vacuum-operated, manually controlled front booster unit adapted for pressurizing fluid in a front hydraulic fluid brake actuating system and a vacuum-operated inertia controlled rear booster unit adapted for pressurizing fluid in a rear hydraulic fluid brake actuating system, an inertia valve means including, an inertia lever pivotally mounted on its low end, a valve housing receiving said inertia lever, a weighted portion on the upper end of said inertia lever, a vacuum conduit in communication with a source of vacuum through said front booster unit and connected to said rear booster unit, an inlet passage in said housing connected to said vacuum conduit, a valve seat within said valve housing on said inlet passage, a valve element engaging said valve seat, a valve guide supporting said valve element, said valve guide pivotally connected to the intermediate portion of said inertia lever, an adjusting screw determining the retracted position of said inertia lever and thereby controlling the degree of deceleration to initiate the actuation of said vacuum control valve, said vacuum conduit in communication with the vacuum chamber of said rear booster unit, a passage concentrically with the end of a piston member operated within a dashpot, a dashpot including said piston member, said piston member engaging intermediate portion of said inertia lever, said piston member initially assisted by the inward movement of air during evacuation of said rear booster unit and softening the forward movement of said inertia member when said valve element engages said valve seat.

3. In a vehicle brake system having a vacuum operated front booster unit adapted for pressurizing fluid in a front hydraulic fluid brake actuating system and a vacuum operated inertia controlled rear booster unit adapted for pressurizing fluid in a rear hydraulic fluid brake actuating system, an inertia valve means including a valve housing, an inertia lever pivoted on one end, a weighted portion formed on the opposite end of said lever, a source of vacuum, an inlet conduit means connecting the source of vacuum to said valve housing through said front booster unit, an inlet passage means in said valve housing in communication with said conduit means, a valve seat formed on said inlet passage, a valve element mounted on a valve guide engaging said valve seat, concentric holes in said valve housing receiving said valve guide, cylindrical openings formed in said valve housing, an outlet passage in communication with said rear booster unit and one of said openings, a piston received in said cylindrical openings engaging the intermediate portion of said lever, a dash-pot formed by the second of said cylindrical opening and said piston, means for controlling the flow of air from said dash-pot thereby providing a means of dampening the movement of said inertia lever for controlling the movement of said inertia valve when said vehicle brake is actuated.

References Cited in the file of this patent

UNITED STATES PATENTS

| | | |
|---|---|---|
| 1,623,921 | Howell | Apr. 5, 1927 |
| 2,632,455 | Lynn | Mar. 24, 1953 |
| 2,876,044 | Hill | Mar. 3, 1959 |
| 2,934,381 | Hill | Apr. 26, 1960 |